(12) United States Patent
Ifrim

(10) Patent No.: US 6,703,741 B1  
(45) Date of Patent: Mar. 9, 2004

(54) PERMANENT MAGNET ROTOR PORTION FOR ELECTRIC MACHINES

(75) Inventor: Costin Ifrim, Hamden, CT (US)

(73) Assignee: EcoAir Corp., Hamden, CT (US)

( * ) Notice: Subject to any disclaimer, the term of this patent is extended or adjusted under 35 U.S.C. 154(b) by 0 days.

(21) Appl. No.: 10/069,735

(22) PCT Filed: Sep. 19, 2000

(86) PCT No.: PCT/US00/25657

§ 371 (c)(1),  
(2), (4) Date: Feb. 25, 2002

(87) PCT Pub. No.: WO01/22560

PCT Pub. Date: Mar. 29, 2001

Related U.S. Application Data (60) Provisional application No. 60/154,718, filed on Sep. 20, 1999.

(51) Int. Cl.⁷ .............................. H02K 12/21; H02K 3/00
(52) U.S. Cl. .............................. 310/156.19; 310/156.22; 310/156.41; 310/216; 310/218
(58) Field of Search ....................... 310/154.28, 154.29, 310/156.38–156.41, 156.08, 156.19, 154.22, 216–218

(56) References Cited

U.S. PATENT DOCUMENTS

| | | | | |
|---|---|---|---|---|
| 2,985,779 | A | 5/1961 | Flaningham et al. | 310/156 |
| 3,484,635 | A | 12/1969 | MacKallor, Jr. et al. | 310/266 |
| 3,858,071 | A | 12/1974 | Griffing et al. | 310/266 |
| 4,307,309 | A | 12/1981 | Barrett | 310/166 |
| 4,714,854 | A | 12/1987 | Oudet | 310/268 |
| 4,829,205 | A | 5/1989 | Lindgren | 310/166 |
| 4,831,300 | A | 5/1989 | Lindgren | 310/190 |
| 4,835,431 | A | 5/1989 | Lindgren | 310/254 |
| 5,004,944 | A | 4/1991 | Fisher | 310/266 |
| 5,010,266 | A * | 4/1991 | Uchida | 310/156.22 |
| 5,204,572 | A | 4/1993 | Ferreira | 310/156 |
| 5,378,953 | A | 1/1995 | Uchida et al. | 310/156 |
| 5,452,590 | A | 9/1995 | Vigili | 66/8 |
| 5,543,676 | A | 8/1996 | York et al. | 310/263 |
| 5,641,276 | A | 6/1997 | Heidelberg et al. | 417/423.7 |
| 5,829,120 | A | 11/1998 | Uchida et al. | 29/598 |
| 5,892,313 | A | 4/1999 | Harris et al. | 310/263 |
| 5,925,964 | A | 7/1999 | Kusase et al. | 310/263 |
| 5,965,967 | A | 10/1999 | Liang et al. | 310/263 |
| 6,002,194 | A | 12/1999 | Asao | 310/269 |
| 6,013,968 | A | 1/2000 | Lechner et al. | 310/263 |
| 6,066,908 | A | 5/2000 | Woodward, Jr. | 310/268 |

* cited by examiner

*Primary Examiner*—Tran Nguyen  
(74) *Attorney, Agent, or Firm*—Raymond A. Nuzzo (57) ABSTRACT

A rotor for an electric machine comprising a plurality of independent poles (58) having a triangular cross section shape and permanent magnets (56) having a trapezoidal cross section shape. The shapes of the independent poles and permanent magnets cooperate to improve the integrity of the lodgment of each permanent magnet.

15 Claims, 6 Drawing Sheets

PERMANENT MAGNET ROTOR PORTION FOR ELECTRIC MACHINES

This application claims the benefit of provisional application 60/154,718 filed Sep. 20, 1999.

TECHNICAL FIELD

The present invention generally relates to alternators of the type that are used in vehicles to provide electrical power for running accessories and charging batteries. More particularly, this invention relates to an improved permanent magnet rotor portion for use by the alternators and other electric machines.

BACKGROUND ART

Typical rotor configurations that are used in alternators are disclosed in U.S. Pat. Nos. 5,693,995, 5,710,471, 5,747,909 and 5,753,989.

DISCLOSURE OF THE INVENTION

In one aspect, the present invention is directed to a rotor for an electric machine comprising a plurality of independent poles and permanent magnets circumferentially arranged in an alternating configuration such that each permanent magnet is positioned intermediate a pair of consecutive or successive independent poles. The arrangement of the permanent magnets and independent poles defines an outer rotor perimeter and a central opening for receiving a shaft upon which the rotor rotates. Each independent pole has a generally triangular cross-section that defines an apex portion that confronts the central opening and an end portion that forms a portion of the outer rotor perimeter. Each permanent magnet has a first end for confronting the central opening, and a second end that forms a portion of the outer rotor perimeter. Each permanent magnet tapers from the first end to the second end. This particular geometry of each permanent magnet is referred to herein as "reverse trapezoidal". An important feature of the rotor of the present invention is that the centrifugal force produced by rotation of the rotor radially pushes each permanent magnet away from the central opening. Furthermore, the aforementioned centrifugal force cooperates with the shape of the independent poles and permanent magnets to further improve the integrity of the lodgment of each permanent between the corresponding pair of consecutive independent poles. Each pair of consecutive independent poles are separated by a space that has a shape that conforms to the shape of a corresponding permanent magnet that is positioned within the space.

The rotor of the present invention further comprises a pair of hubs. The permanent magnets and independent poles are positioned between the hubs. The independent poles are at to the hubs in such a manner that there is no interconnection between the apex portions of the independent poles so as to induce magnetization having a direction that is substantially orthogonal to the radius of the rotor.

The permanent magnets are formed from a magnetic material chosen from ferrite, neodymium, ceramic and samarium-cobalt In a related aspect, the present invention is directed to rotor for an electric machine, comprising at least two independent poles and at least two permanent magnets arranged in an alternating configuration such that each permanent magnet is positioned intermediate a pair of consecutive or successive independent poles. The arrangement of the permanent magnets and independent poles defines an outer rotor perimeter and a central opening for receiving a shaft upon which the rotor rotates. Each independent pole has a fit end portion that confronts the central opening and a second end portion that forms a portion of the outer rotor perimeter. The second end portion of each independent pole has a pair of lips that conform to the locally defined curvature of the outer rotor perimeter. Each permanent magnet has a first end for confronting the central opening and a second end that forms a portion of the outer rotor perimeter. Each lip of the second end portion of each independent pole abuts a portion of the second end of a corresponding permanent magnet, whereby the centrifugal force produced by rotation of the rotor radially pushes each permanent magnet away from the central opening and whereby the centrifugal force cooperates with the independent poles and permanent magnets to further improve the integrity of the lodgment of each permanent magnet between the responding pair of independent poles. Each pair of consecutive or successive independent poles are separated by a space that has a shape that conforms to the shape of a corresponding permanent magnet that is positioned within the space. In one embodiment, each permanent magnet has a reverse trapezoidal cross-section. In another embodiment each permanent magnet has a generally cross-section.

BRIEF DESCRIPTION OF THE DRAWINGS

The features of the invention are believed to be novel. The figures are for illustration purposes only and are not drawn to scale. The invention itself, however, both as to organization and method of operation, may best be understood by reference to the detailed description which follows taken in conjunction with the accompanying drawings in which.

MODES FOR CARRYING OUT THE INVENTION

In describing the preferred embodiments of the present invention, reference will be made herein to FIGS. 1–10 of the drawings in which like numerals refer to like features of the invention.

In order to facilitate understanding and appreciation of the advantages of the permanent magnet rotor portion of the present invention, a typical prior art permanent magnet rotor section is first described with reference being made to FIGS. 1 and 2.

Figure 1:
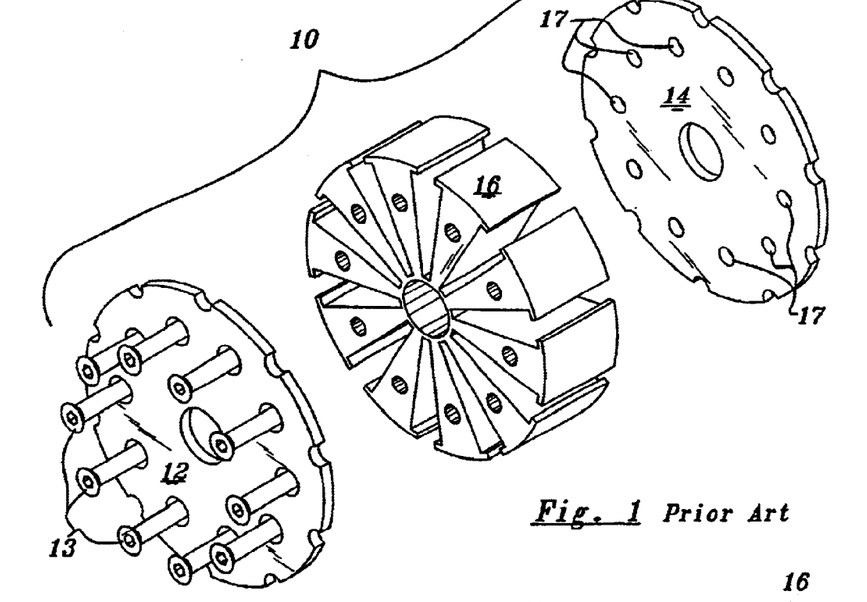
FIG. 1 is an exploded view of a prior art permanent magnet rotor section.

Referring to FIGS. 1, there is shown prior art rotor assembly 10. Assembly 10 generally comprises hub 12, screws 13, hub 14 and pole structure 16. Screws 13 are disposed through corresponding opening in pole structure 16 and threadedly engaged with threaded holes 17 in hub 14.

When installed in an electric machine, rotor 10 rotates with respect to a stator (not shown). Typical configurations applied for alternators are described in commonly owned U.S. Pat. Nos. 5,693,995, 5,710,471, 5,747,909 and 5,753,989, the disclosures of which are incorporated herein by reference.

Figure 2:
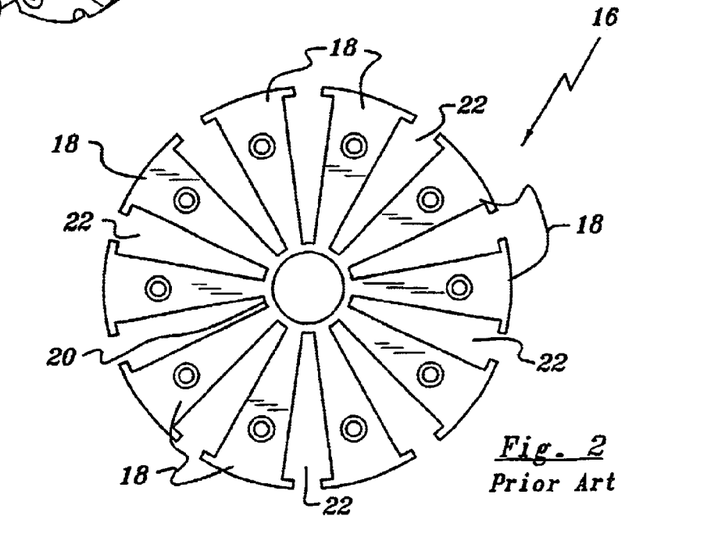
FIG. 2 is a top plan view of the poles depicted in FIG. 1.

Referring to FIG. 2, ten (10) rotor field poles 18 radially extend from rotor core 20. Rotor 16 is fabricated from material having a high magnetic permeability. Rotor 16 can be constructed as a single solid piece or from a plurality of laminations having a cross-sectional shape shown in FIG. 2. Spaces 22 between poles 18 are sized for receiving permanent magnets (not shown) having tangential magnetization. A mechanical clearance is required in between the dimensions of spaces 22 and the magnet dimensions in order to insert the magnets during manufacturing. As a result of such a configuration, a "parasitic" (mechanical) air gap is created which degrades the performance of the electric machine. Furthermore, an unusable flux path or flux leakage path is developed at core 20. This unusable flux path results in a significant "leakage flux" that degrades the efficiency and performance of the electric machine. These disadvantages of the prior art permanent magnet rotor section are addressed and eliminated by the permanent magnet rotor portion of the present invention.

Figure 3:
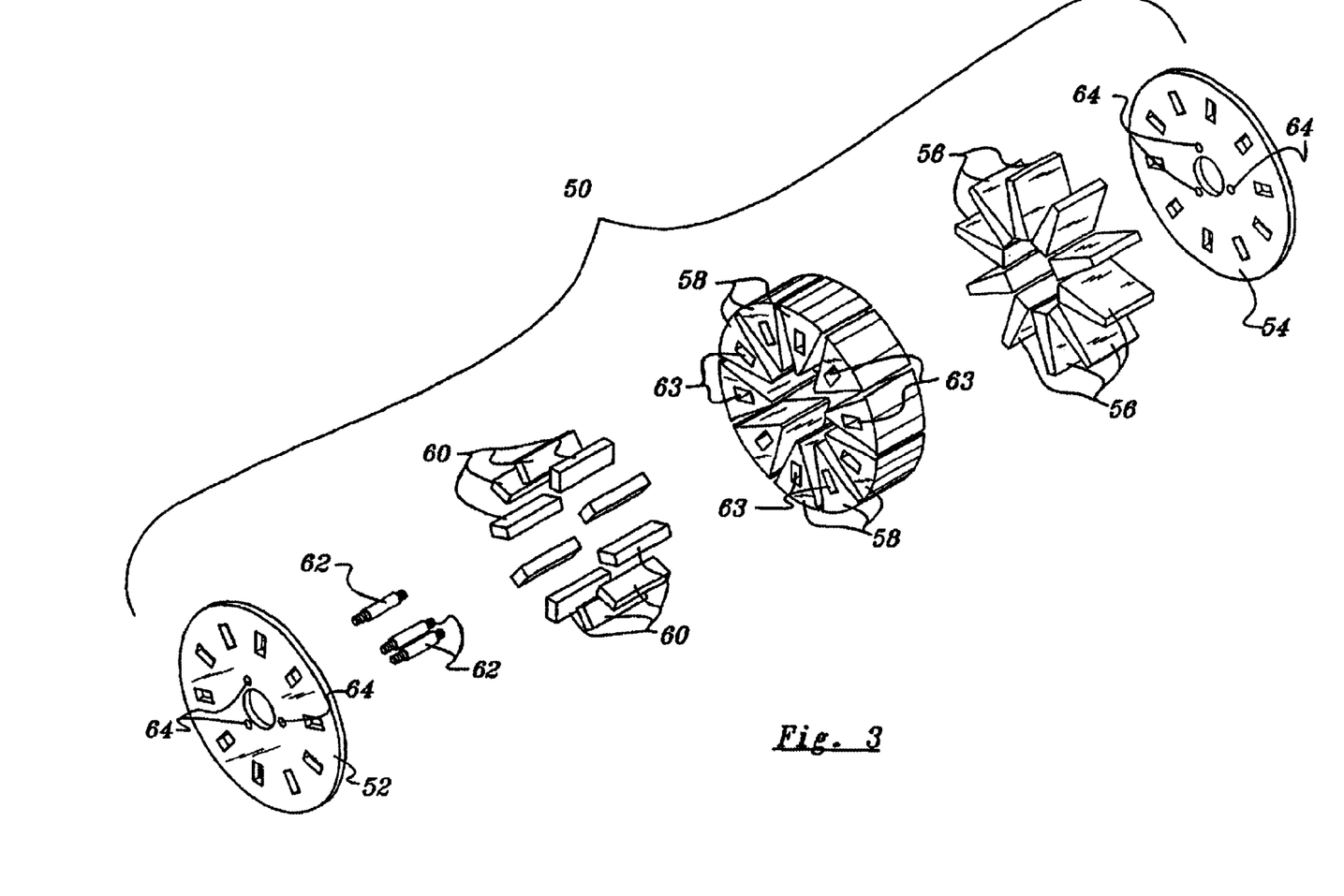
FIG. 3 is an exploded view of the permanent magnet rotor portion of the present invention
Figure 4:
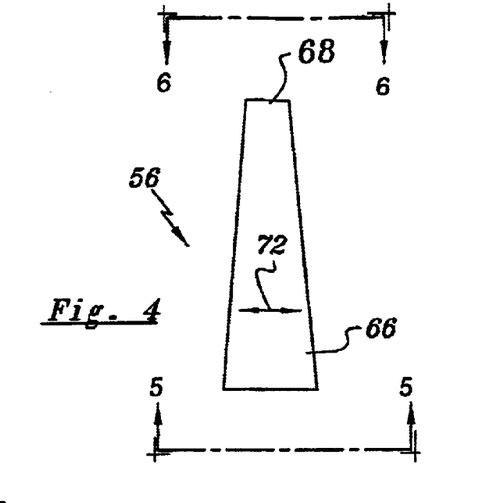
FIG. 4 is a side elevational view of a permanent magnet depicted in FIG. 3.
Figure 5:
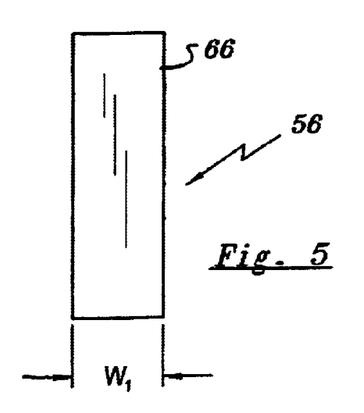
FIG. 5 is a view taken along line 5—5 of FIG. 4.
Figure 6:
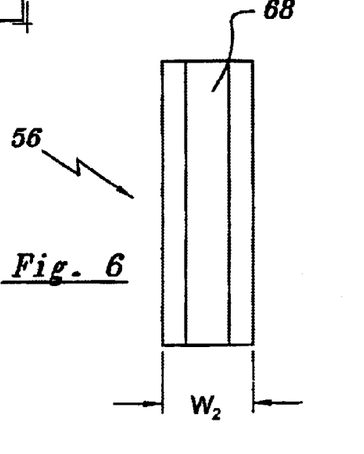
FIG. 6 is a view taken along line 6—6 of FIG. 4.
Figure 7:
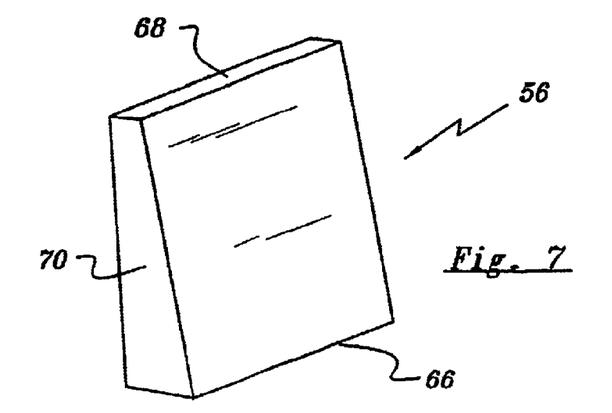
FIG. 7 is a perspective view of the permanent of FIG. 4.

Referring to FIG. 3, there is shown an exploded view of permanent magnet rotor portion 50 of the present invention. Rotor portion 50 generally comprises hubs 52 and 54, permanent magnets 56, independent poles 58, holding bolts 60 and 62. Each pole 58 further includes axially extending openings 63 sized for receiving a corresponding bolt 60. Hubs 52 and 54 have threaded openings 64 for receiving bolts 62. Hubs 52 and 54 are fabricated from a non-magnetic (low magnetic permeability) material. Independent poles 58 and holding bolts 60 are fabricated from high magnetic permeability material.

Figure 8:
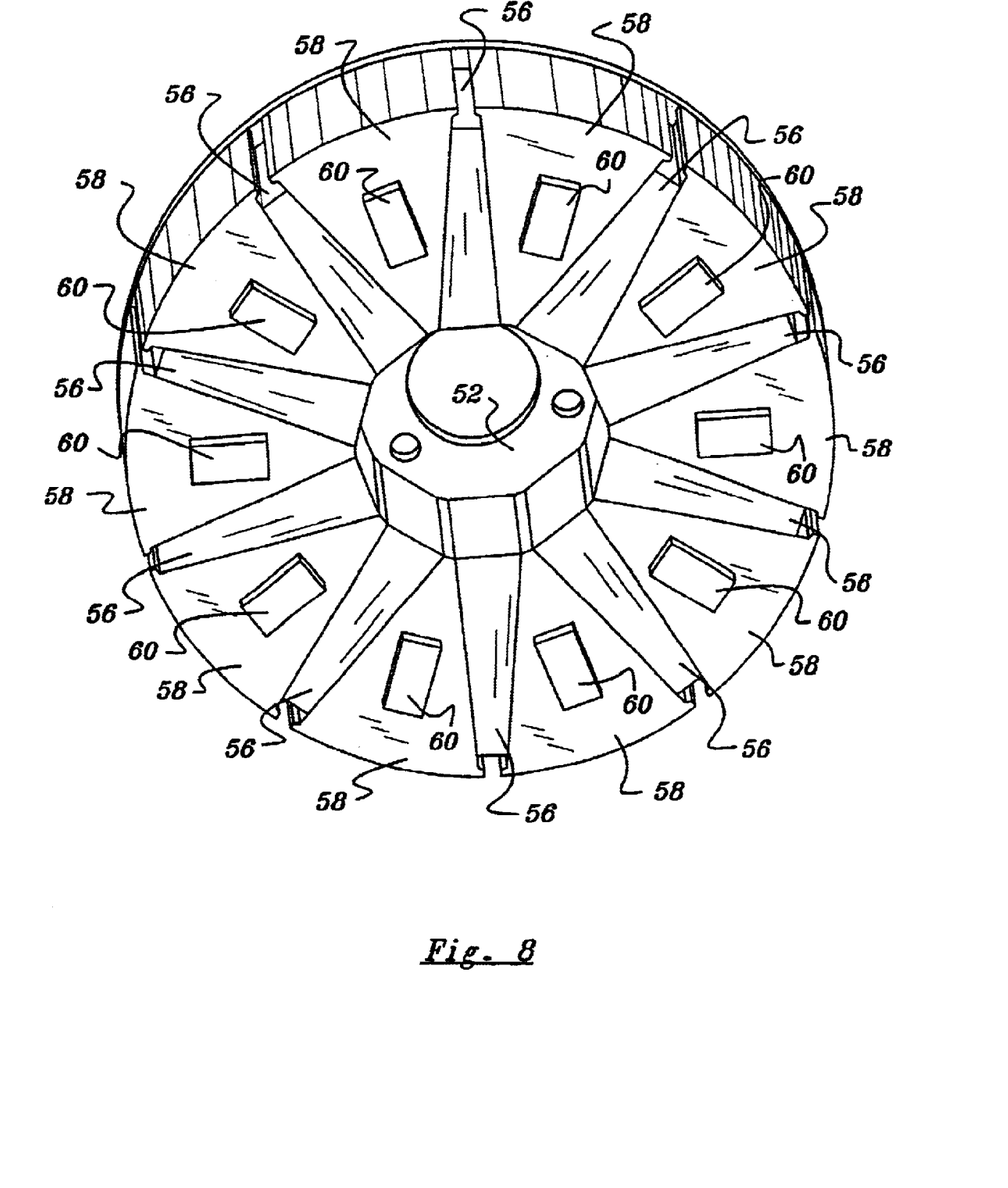
FIG. 8 is a perspective view of the permanent magnet rotor section of the present invention.
Figure 9:
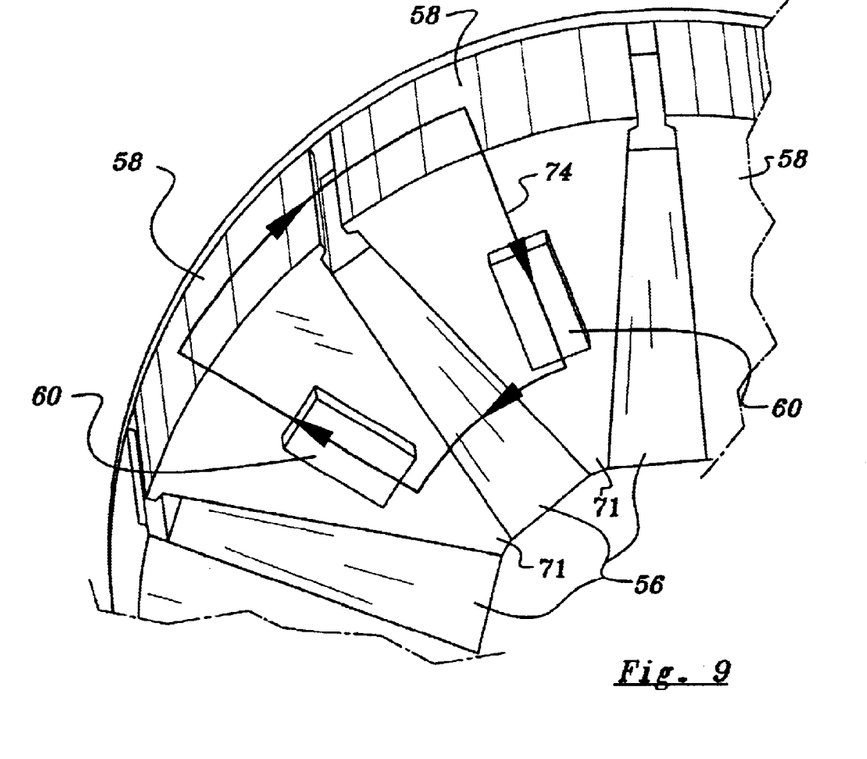
FIG. 9 shows a portion of the permanent magnet rotor section shown in FIG. 8 and the flux path through that portion of the rotor.
Figure 9A:
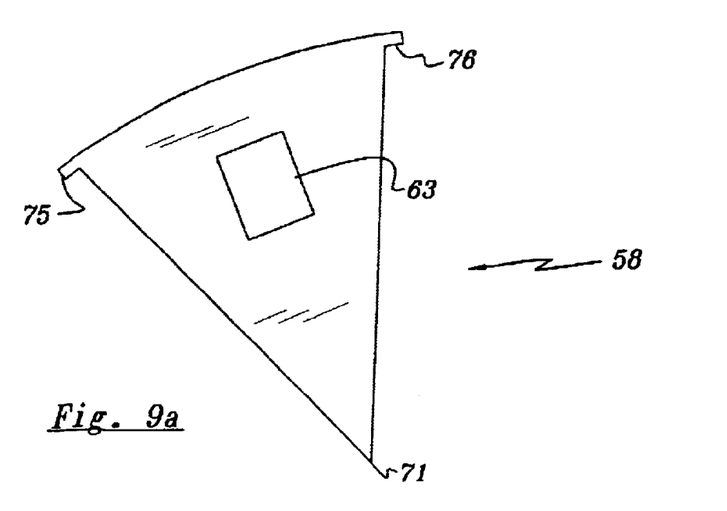
FIG. 9A is a top plan view of a pole depicted in FIGS. 3, 8 and 9.

Referring to FIGS. 3, 4–7 and 8, in a preferred embodiment, permanent magnets 56 have a particular shape and orientation that is referred to herein as "reverse trapezoidal". The space between each pair of successive or consecutive poles 58 has a shape that conforms to the shape of the corresponding permanent magnet 56 that is positioned within that space between the pair of successive or consecutive poles 58. Each magnet 56 has end 66 which has a width W1 and end 68 which has a width W2 that is less than width W1. Magnet 56 further includes a pair of sides, one of which being designated by numeral 70, the other not being shown. Referring to FIG. 8, an important feature of the present invention is the particular shape and arrangement of poles 58 and the placement of each magnet 56 in the spaces between poles 58. Referring to FIGS. 9 and 9A, each pole 58 is shaped as a disc sector and has a generally triangular cross-section wherein apex 71 of each pole 58 is directed to the center of the rotor or the shaft (not shown) upon which rotor 50 will rotate. The shape of each pole 58 and the position of each pole 58 with respect to the other poles 58 provides spaces between each pair adjacent poles 58 that generally conform to the shape of a trapezoid. Each magnet 56 is inserted in a corresponding space between each pair of consecutive or successive poles 58. Thus, end 68 of each magnet is generally on the outside diameter or circumference of the rotor 50. One important feature of the magnet and pole configuration shown in FIGS. 3, 4–7 and 8 is that there is no interconnection of apices 71 of the triangular shaped poles 58 at the internal diameter level in contrast to the prior art rotor structure shown in FIG. 2. As a result of the magnet and pole configuration of the present invention, the magnetization direction, indicated by arrow 72 (see FIG. 4), is substantially orthogonal to the radius of rotor 50. In other words, the structure and arrangement of magnets 56 and poles 58 forces the flux to be focused toward the active air gap that is between the rotor and the stator (not shown). The resulting flux path is illustrated in FIG. 9 and is indicated by numeral 74.

The shapes of magnets 56 and poles 58 cooperate to prevent magnets 56 from becoming dislodged from the spaces between poles 58. During rotation of rotor 50, a centrifugal force is applied to magnets 56 and wedges and locks the diameter of rotor 50. Thus, the problems and disadvantages associated with the unusable flux path created at the interconnection of poles 18 in the prior art rotor structure shown in FIG. 2 are eliminated by the particular structure and arrangement of permanent magnets 56 and poles 58 of rotor 50 of the present invention. In this way, "parasitic" air gaps are virtually eliminated. Referring to FIG. 9A, in a preferred embodiment, each pole 58 also includes lips 75 and 76 in order to further secure magnets 56 and to eliminate outward, radial movement of each magnet 56 into the active air gap between the rotor 50 and the stator (not shown). In an alternate embodiment, an adhesive film is applied to the contact surface between each magnet 56 and adjacent poles 58.

In an alternate embodiment, rectangular magnets can be used in place of magnets 56. In such a configuration, the space between each pair of successive or consecutive independent poles is generally rectangular shaped, and the independent poles have lips (similar to lips 75 and 76) that radially constrain the rectangular shaped magnets. An adhesive film is applied to the contact surface between the rectangular magnets and poles 58.

A preferred step in the assembly process of rotor 50 is to spin rotor 50 so as to allow the centrifugal force to radially push magnets 56 prior to balancing rotor 50.

Figure 10:
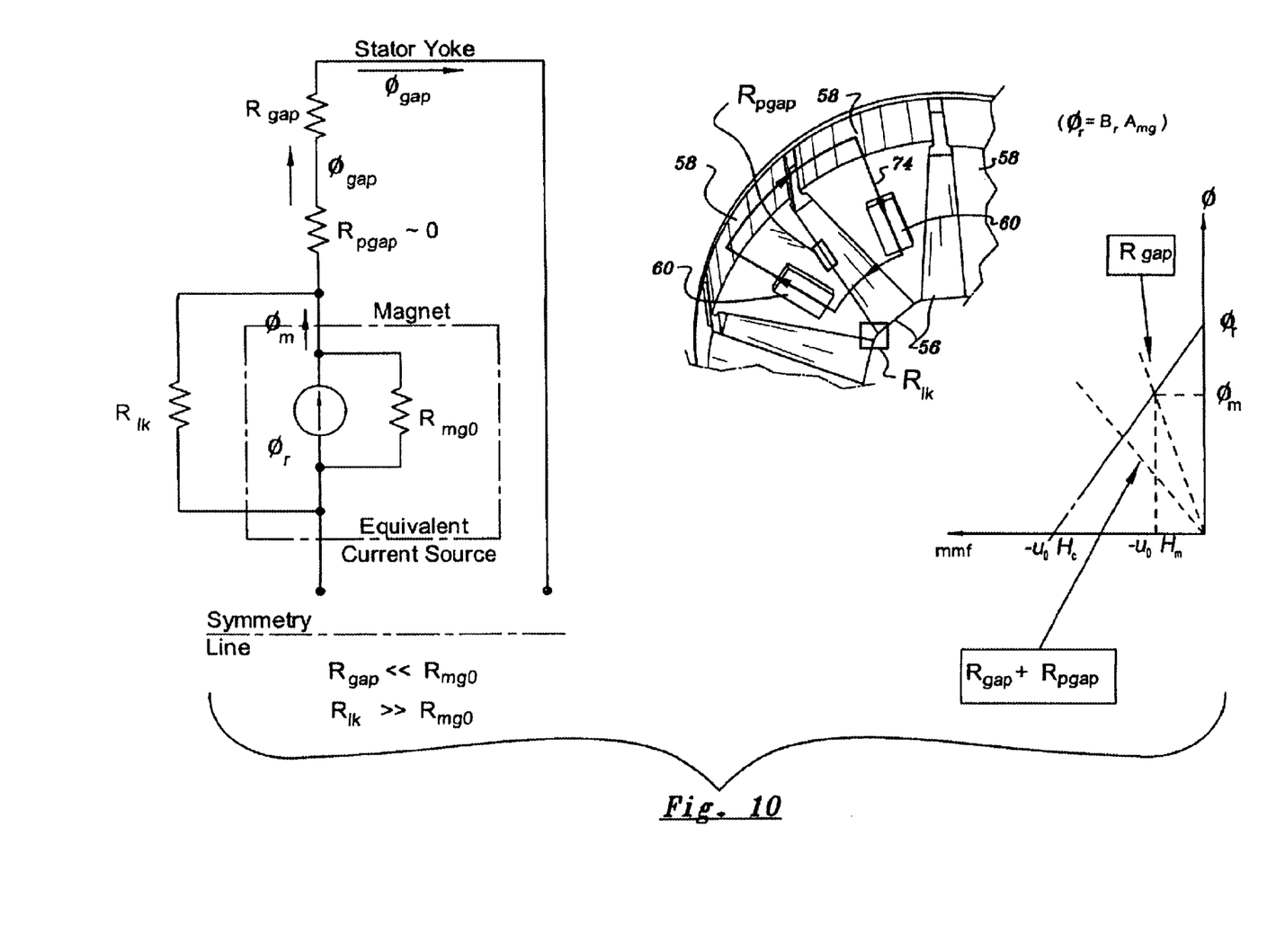
FIG. 10 is a diagram that the illustrates properties of a focused flux path resulting from the structure of the permanent magnet rotor section of the present invention.

Referring to FIG. 10, there is shown a graph of Ø vs. mmf (flux vs. magnetic motor force) graph and an equivalent circuit that represents the properties of the flux path developed by the and arrangement of magnets 56 and poles 58. The symbols shown in the equivalent circuit have the following meanings:

$R_{gap}$: machine gap air reluctance;

$R_{pgap}$: parasitic air gap reluctance in between each magnet 56 and pole 58;

$R_{lk}$: leakage reluctance present at the end of the magnets;

$R_{mg0}$: internal magnet reluctance defined by magnet thickness;

$Ø_r$: internal magnetic flux, assimilated in the magnetic circuit as an ideal current source ($Ø_r$=$B_r A_{mg}$ represents the product between the remanent flux density of the permanent magnet and its surface orthogonal to the magnetization direction);

$Ø_m$: magnetic flux produced by the magnet;

$Ø_{gap}$: magnetic flux in the machine air gap.

Referring to FIG. 10, each permanent magnet 56 is pushed radially by the centrifugal force and therefore, the parasitic air gap is minimized bringing the value $R_{pgap}$, close to zero. This is reflected in the Ø vs. mmf graph by moving the load line towards the flux line. As a result, the gap flux is higher. Thus, use of independent poles 58 and the prevention of the magnetic flux in finding a shortening path substantially minimize the leakage reluctance.

Since there is no connection between the independent poles 58 at the internal diameter level, a major leakage path has been eliminated in contrast to prior art permanent magnet rotor sections. In the configuration wherein the reverse trapezoidal shaped magnets 56 are used, these magnets substantially eliminate the parasitic air-gap that is required (due to assembly tolerances) when inserting prior art rectangular magnets into the corresponding rectangular spaces. This is due to the fact that while the rotor 50 spins, the independent poles 58 are radially held in place by hubs 52 and 54 and holding bolts 60 and 62 while permanent magnets 56 are radially pushed by the centrifugal force. Thus, the parasitic air-gap is substantially eliminated.

In view of the foregoing description, it is apparent that rotor 50 is relatively less complex in construction than prior art rotor structures. Furthermore, it is to be understood that although rotor 50 has been described in terms of being used in alternators or hybrid alternators, it is to be understood that rotor 50 can be used in any electrical machine that uses permanent magnets.

The principals, preferred embodiments and modes of operation of the present invention have been described in the foregoing specification. The invention which is intended to be protected herein should not, however, be construed as limited to the particular forms disclosed, as these are to be regarded as illustrative rather than restrictive. Variations in changes may be made by those skilled in the art without departing from the spirit of the invention Accordingly, the foregoing detailed description should be considered exemplary in nature and not limited to the scope and spirit of the invention as set forth in the attached claims. Thus, having described the invention.

What is claimed is:

1. A rotor configured for use with a vehicle alternator wherein the rotor rotates within and respect to a stator of the vehicle alternator, the rotor comprising a plurality of independent poles and permanent magnets circumferentially arranged in an alternating configuration such that each permanent magnet is positioned intermediate a pair of consecutive independent poles, the arrangement of the permanent magnets and independent poles defining an outer rotor perimeter and a central opening for receiving a shaft upon which the rotor rotates, each independent pole having a generally triangular cross-section that defines an apex portion that confronts the central opening and an end portion that forms a portion of the outer rotor perimeter, each permanent magnet having a reverse trapezoidal cross-section, a first end for confronting the central opening, and a second end that forms a portion of the outer rotor perimeter, each permanent magnet tapering from the first end to the second end, the rotor further comprising a pair of hubs, the permanent magnets and independent poles being positioned between the hubs, the independent poles being attached to the hubs in such a manner that there is no interconnection between the apex portions of the independent poles so as to induce magnetization having a direction that in substantially orthogonal to the radius of the rotor.

2. The rotor according to claim 1 wherein the end portion of each independent pole defines a pair of lips that conforms to the locally defined curvature of the outer rotor perimeter.

3. The rotor according to claim 1 wherein each independent pole has an axially extending bore that is generally rectangular in shape and is sized for receiving a holding bolt that has a generally rectangular cross-section, the axially extending bore preventing rotation of the independent pole about the holding bolt and radial movement of the independent pole.

4. The rotor according to claim 3 wherein the independent poles and holding bolts are fabricated from relatively high magnetic permeable materials.

5. The rotor according to claim 1 wherein each magnet is formed from a magnetic material chosen from ferrite, neodymium, ceramic and samarium-cobalt.

6. The rotor according to claim 1 wherein the independent poles are separated by a space that has a shape that conforms to the shape of a corresponding permanent magnet that is positioned within the space.

7. An independent pole for use in a permanent magnet rotor having a central opening for receiving a shaft upon which the rotor rotates, an outer rotor perimeter, and at least two permanent magnets, the independent pole having a generally triangular cross-section that defines an apex portion that confronts the central opening and an end portion that forms a portion of the outer rotor perimeter, each independent pole having an axially extending bore that in generally rectangular in shape and is sized for receiving a holding bolt that has a generally rectangular cross-section, the axially extending bore preventing rotation of the independent pole about the holding bolt and radial movement of the independent pole.

8. The independent pole according to claim 7 wherein each independent pole is fabricated from relatively high magnetic permeable materials.

9. A permanent magnet configured for placement between a pair of consecutive independent poles of a rotor wherein each independent pole has a generally triangular cross-section and the rotor has a central opening for receiving a shaft upon which the rotor rotates and an outer rotor perimeter, the permanent magnet having a reverse trapezoidal cross-section, a first end for confronting the central opening, and a second end that forms a portion of the outer rotor perimeter, the permanent magnet tapering from the first end to the second end.

10. The permanent magnet according to claim 9 wherein the permanent magnet is formed from a magnetic material chosen from ferrite, neodymium, ceramic and samarium-cobalt.

11. A rotor for an alternator, comprising at least two independent poles and at least two permanent magnets arranged in an alternating configuration such that each permanent magnet in positioned intermediate a pair of consecutive independent poles, the arrangement of the permanent magnets and independent poles defining an outer rotor perimeter and a central opening for receiving a shaft upon which the rotor rotates, each independent pole having a first end portion that confronts the central opening and a second end portion that forms a portion of the outer rotor perimeter, the second and portion of each independent pole having a pair of lips that conform to the locally defined curvature of the outer rotor perimeter, each permanent magnet having a first end for confronting the central opening and a second end that forms a portion of the outer rotor perimeter, each lip of the second end portion of each independent pole abutting a portion of the second end of a corresponding permanent magnet, each independent pole having an axially extending bore that is generally rectangular in shape and is sized for receiving a holding bolt that has a generally rectangular cross-section, the axially extending bore preventing rotation of the independent pole about the holding bolt and radial movement of the independent pole.

12. The rotor according to claim 11 wherein each pair of consecutive independent poles are separated by a space that has a shape that conforms to the shape of a corresponding permanent magnet that is positioned within the space.

13. The rotor according to claim 11 wherein each permanent magnet has a reverse trapezoidal cross-section.

14. The rotor according to claim 11 wherein each permanent magnet has a generally rectangular cross-section.

15. The rotor according to claim 2 wherein each lip abuts a corresponding permanent magnet.

* * * * *

UNITED STATES PATENT AND TRADEMARK OFFICE
CERTIFICATE OF CORRECTION

PATENT NO.        : 6,703,741 B1  
APPLICATION NO. : 10/069735  
DATED             : March 9, 2004  
INVENTOR(S)       : Costin Ifrim Page 1 of 1

It is certified that error appears in the above-identified patent and that said Letters Patent is hereby corrected as shown below:

Col. 5, line 60, please delete "in" and replace with --is--.

Col. 6, line 22, please delete "in" and replace with --is--.

Signed and Sealed this

Eighth Day of January, 2008

JON W. DUDAS  
*Director of the United States Patent and Trademark Office*